United States Patent [19]

Markiewicz

[11] Patent Number: 5,150,585
[45] Date of Patent: Sep. 29, 1992

[54] ENERGY RECOVERY SYSTEM FOR COLD STORAGE WAREHOUSE

[76] Inventor: Stanley Markiewicz, 842 Shoreview Dr., Henderson, Nev. 89015

[21] Appl. No.: 687,583

[22] Filed: Apr. 17, 1991

[51] Int. Cl.$^5$ .......................... F25B 9/00; F25D 9/00
[52] U.S. Cl. ........................................ 62/467; 62/87; 62/402
[58] Field of Search ...................... 62/86, 87, 402, 467

[56] References Cited

U.S. PATENT DOCUMENTS

| | | |
|---|---|---|
| 1,379,102 | 5/1921 | Jeffries . |
| 2,392,783 | 1/1946 | Stevens ............................ 62/402 X |
| 2,394,253 | 2/1946 | Nettel et al. ....................... 62/402 X |
| 2,737,031 | 3/1956 | Wulle ................................... 62/87 |
| 3,067,590 | 12/1962 | Wood, Jr. ............................ 62/335 |
| 3,194,026 | 7/1965 | La Fleur ........................... 62/402 X |
| 3,196,631 | 7/1965 | Holland ............................... 62/87 X |
| 3,241,327 | 3/1966 | La Fleur ........................... 62/402 X |
| 3,394,555 | 7/1968 | La Fleur ........................... 62/402 X |
| 3,668,884 | 6/1972 | Nebgen ............................. 62/402 X |
| 3,788,092 | 1/1974 | Miller ................................ 62/467 X |
| 4,103,493 | 8/1978 | Shoenfelder ....................... 62/467 X |
| 4,214,170 | 7/1980 | Leonard .............................. 62/87 X |
| 4,214,451 | 7/1980 | Coombes et al. .................... 60/648 |
| 4,261,176 | 4/1981 | Theyse .............................. 62/467 X |
| 4,377,074 | 3/1983 | Jardine ................................ 60/183 |
| 4,510,756 | 4/1985 | Hise et al. ............................ 60/659 |
| 4,711,093 | 12/1987 | Markbreiter et al. .................. 62/87 |
| 4,752,697 | 6/1988 | Lyons et al. ......................... 290/2 |
| 4,802,100 | 1/1989 | Aasen et al. ....................... 364/494 |
| 4,819,444 | 4/1989 | Meckler ............................... 62/238 |
| 4,873,834 | 10/1989 | Cox .................................... 62/87 |
| 4,903,503 | 2/1990 | Meckler ............................... 62/238 |

OTHER PUBLICATIONS

Popular Science Magazine, Dec. 1990 article by Paul Rosta entitled "Elevators that Capture Energy" pp. 98-99.
Popular Science Magazine, Dec. 1990 article by Mariette DiChristina entitled "Canada's Energy Miser", pp. 94-97.
Refrigeration and Air Conditioning, by Jordan & Priester, Prentice Hall, 1949 photocopy from PTO Library, p. 58.

*Primary Examiner*—Henry A. Bennett
*Assistant Examiner*—Christopher B. Kilmer
*Attorney, Agent, or Firm*—Quirk, Tratos & Roethel

[57] ABSTRACT

Energy recovery systems for cold storage warehouses refrigerated by mechanical refrigeration apparatus co-acting with a energy recovery unit including a turbine driving an electromotive generator. The cogenerator turbine is driven by the kinetic energy extracted from refrigerant flowing through a first conduit system connecting the compressor, evaporators and condenser of the refrigeration or by the kinetic energy extracted from a coolant being pumped through a second conduit system independent of the first conduit system to cool the compressor as it becomes heated during compression of refrigerant from a vapor phase to a liquid phase during the refrigeration cycle. The extraction of the kinetic energy of the refrigerant flow or coolant flow and the heat generated by the compressor during the refrigerant compression phase represents useful work obtained from the energy recovery system from available surplus energy that otherwise would be wasted.

20 Claims, 5 Drawing Sheets

ENERGY RECOVERY SYSTEM FOR COLD STORAGE WAREHOUSE

This invention relates to warehouses for receiving and storing processed refrigerated and frozen food products waiting to be shipped to a market place or commissary, and more particularly to warehouses having energy recovery systems for controlling the temperature in the cold storage cells in the warehouses and for utilizing surplus energy available in the basic refrigeration apparatus for auxiliary purposes.

BACKGROUND OF THE INVENTION

Systems of the type that use surplus energy that would otherwise be wasted are generally referred to as energy recovery or cogeneration systems. U.S. Pat. No. 4,214,451 issued to Graham E. Combs and Hiranya Rao, for example, discloses a system that utilizes primary steam to generate electrical energy and exhaust steam, which would otherwise be wasted, to operate various industrial processes in a plant.

U.S. Pat. No. 4,510,756, issued to Ralph E. Hise and Paul Swenson, simply entitled "Cogeneration", discloses a system that permits centralized electric utility plants, while operating at relatively high thermodynamic efficiency, to utilize the heat of the bulk of their rejected low-grade (low-temperature) steam for secondary purposes, such as water heating. The heat of the low-grade steam ordinarily would be wasted by exhausting the same to the atmosphere.

U.S. Pat. No. 4,752,697, issued to James P. Lyons, and U.S. Pat. No. 4,802,100 issued to Robert K. Aasen, also show systems that reference the broad term "cogeneration."

It is an object of the present invention to apply the broad principle of energy cogeneration to apparatus utilized in controlling the temperature of storage cells in warehouses or other structures designed for cold storage, and even to abandoned mines and natural caves which could be adapted for use as cold storage facilities.

More particularly, it is an object of the present invention to utilize or extract otherwise wasted kinetic energy resulting from the movement of refrigerant, which may be ammonia or Freon, through a conduit system connecting the main components of a refrigeration apparatus, namely the compressor, condenser and evaporator.

It is yet a further object of the invention to provide alternate systems operable to extract the kinetic energy of the refrigerant flowing through the conduit system at any one of the several stages in the refrigerant cycle, namely when the refrigerant is in a fluid, vapor or gaseous stage.

It is yet a further object of the invention of the present invention to utilize the kinetic energy of the refrigerant to energize a energy recovery unit comprising a turbine coupled to an electromotive generator for generating electricity.

It is a still further object of the invention to utilize the heat generated by a refrigerator compressor to heat a coolant for circulation to selected areas beneath the cold storage area of warehouse to prevent damaging cold contractions of the warehouse floor while extracting the kinetic energy of circulating coolant to drive an energy recovery turbine to rotate electromotive generator coupled to the turbine.

These and other objects of the invention will be apparent from the disclosure of the preferred embodiment thereof.

SUMMARY OF THE INVENTION

The energy recovery system for warehouses and similar facilities adapted for cold storage purposes, according to the present invention, comprises refrigeration apparatus coacting with energy recovery units having turbines coupled to electromotive generators. Rotation of the turbines to drive the electromotive generators to produce electricity is achieved by utilizing surplus energy available from the operation of the refrigeration apparatus. The surplus energy primarily is the kinetic energy of fluids, vapors and gases flowing through conduit systems forming circuits through which the refrigerant is circulated during the refrigeration cycle of the refrigeration apparatus.

BRIEF DESCRIPTION OF THE DRAWINGS

This invention is described in greater detail with reference to the drawings, in which.

DESCRIPTION OF THE PREFERRED EMBODIMENTS

In my U.S. Pat. No. 4,989,417, I have disclosed a warehouse having a cluster of cells for receiving the storing processed food products at low temperatures. The present invention is directed to energy recovery or cogeneration systems and related accessories for efficiently controlling the temperature in the clusters of storage cells housed in warehouse type buildings or in other facilities such as abandoned mines or natural caverns.

The terminology "energy recovery systems" broadly refers to systems that utilize available surplus energy that would otherwise be wasted. There is available surplus energy in the operation of refrigeration apparatus that can be extracted for purposes other than refrigeration.

Figure 1:
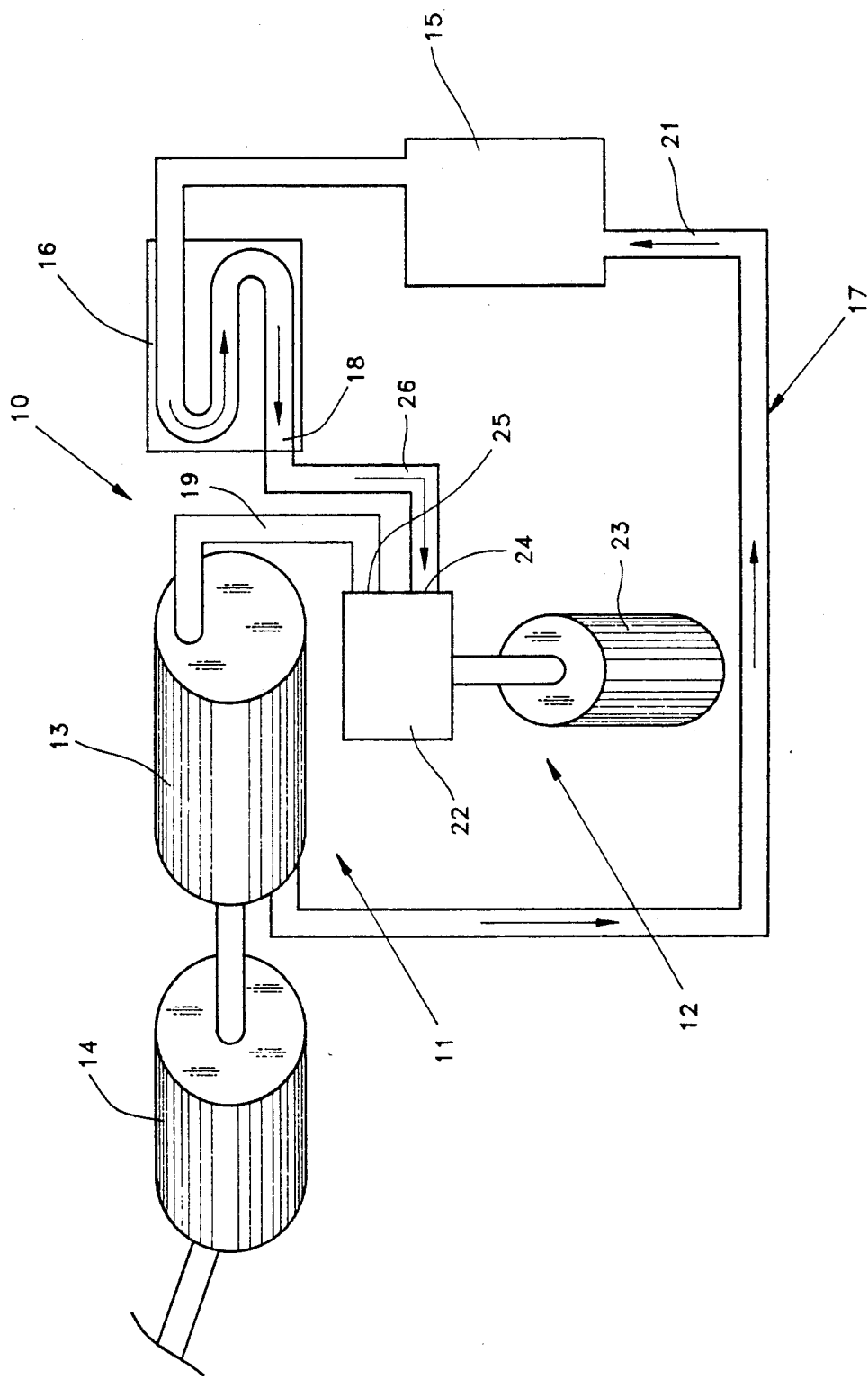
FIG. 1 is a diagrammatic view of an energy recovery system in accordance with the present invention having particular utility or extracted for cold storage facilities.

Referring now to FIG. 1, the energy recovery system diagrammatically illustrated therein, generally designated 10 includes a refrigeration apparatus 11 and a energy recovery unit 12.

The refrigeration apparatus 11 has conventional components, that is, a compressor 13 driven by an electric motor 14, a condenser 15 and an evaporator 16. These components are connected by a conduit system 17 forming a refrigerant flow circuit through which refrigerant is cycled with the refrigerant passing through fluid, vapor and gaseous stages. The refrigerant may be ammonia or Freon. The basic refrigerant flow cycle, as described in many refrigeration manuals, can be applied to FIG. 1 as follows:

Starting at the low side 18 of the evaporator, the refrigerant at this stage is a low temperature and low pressure vapor that flows through a suction line 19 to the compressor 13. The compressor raises the pressure and temperature of the vapor. The now hot high temperature gas flows through conduit section 21 to the condenser 15 where, as it gives up heat, the gas condenses to form a liquid.

The compressor 11 also lowers the pressure in the evaporator 16 causing the refrigerant in the evaporator to boil at a reduced pressure and temperature. Because of the low temperature in the evaporator, a heat transfer from the space to be cooled flows into the evaporator 16 causing the liquid refrigerant in the evaporator to be vaporized. The refrigerant vapor which contains the absorbed heat from the evaporator is pulled through the suction line 17 back to the compressor.

In an ordinary refrigeration apparatus 11, the kinetic energy, the energy associated with the movement of the refrigerant through the conduit system 17, is non-productive or wasted energy. The energy recovery unit 12 provides for the utilization of this energy.

As shown in FIG. 1, the energy recovery unit 12 comprises a turbine 22 coupled to an electromotive generator 23. The turbine 22 has an intake port 24 and an exhaust outlet 25. The turbine is interposed in the conduit system 17 between the evaporator 18 and the compressor 13. That is, a section 26 of the conduit leading from the low side of the evaporator 16 is connected to the intake port 24 of the turbine 22 and the exhaust outlet 25 of the turbine is connected to the compressor 13. The kinetic energy or flow force of the refrigerant vapor channelled through the turbine 22 rotationally drives the turbine rotor (not shown) and thereby the electromotive generator to produce current. The electromotive generator current preferably is fed to transformers controlling current to the warehouse electrical system.

Figure 2:
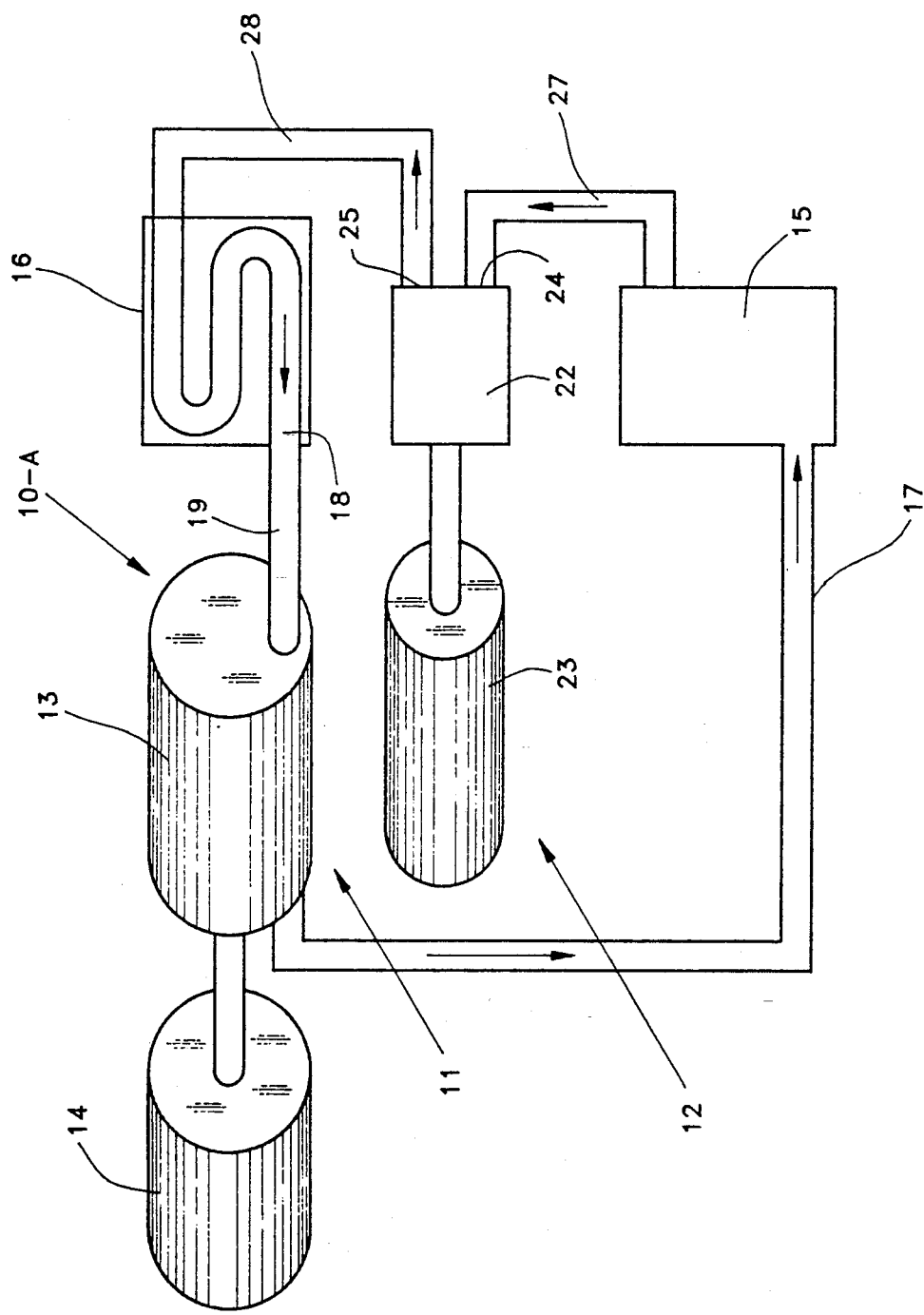
FIG. 2 is a diagrammatic view in part similar to FIG. 1 illustrating another embodiment of the energy recovery system in accordance with the present invention.

In FIG. 2 is shown an alternate energy recovery system, generally designated 10-A, that utilizes the same refrigeration apparatus 11 and energy recovery unit 12 shown in FIG. 1. In this embodiment the turbine 22, however, is interposed in the conduit system 17 between the condenser 15 and the evaporator 16. In this arrangement the turbine intake port 24 is connected to a section 27 to the condenser 15. Section 27 carries liquid refrigerant that is channelled through the turbine causing the turbine to rotate to rotatably drive the electromotive generator. The liquid refrigerant after flowing through the turbine exits the turbine exhaust outlet and flows through section 28 of the conduit 17 to the evaporator 16 where it is vaporized by the heat transfer from the storage compartment. The kinetic energy or flow force of the liquid refrigerant that would otherwise be wasted energy is converted into useful energy in the form of electricity.

Figure 3:
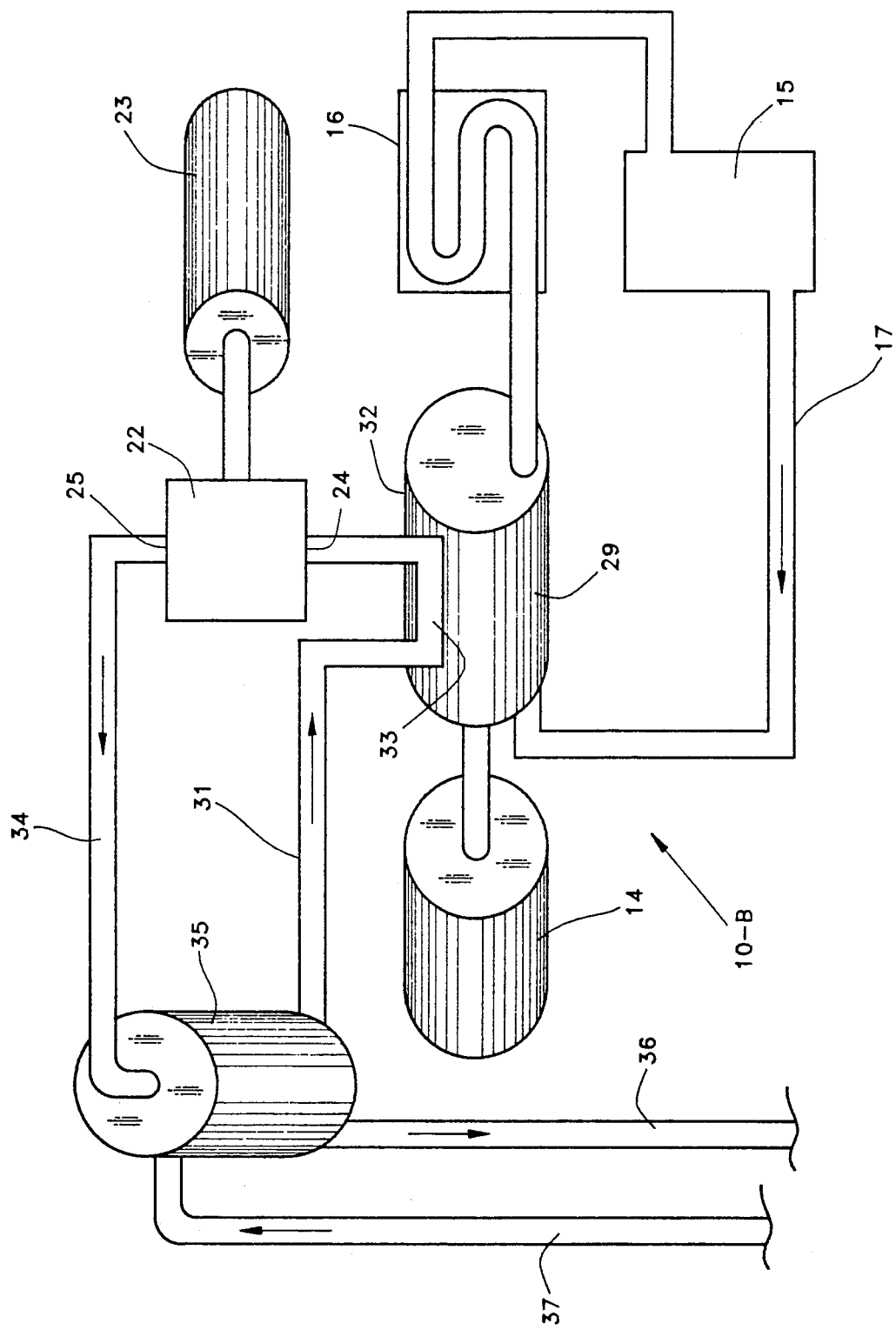
FIG. 3 is a diagrammatic view in part similar to FIG. 1 illustrating yet a further embodiment of an energy recovery system in accordance with the present invention.

Referring now to FIG. 3, the energy recovery system, generally designated 10-B, utilizes substantially the same refrigeration apparatus illustrated in FIGS. 1 an 2 with a slightly modified compressor, herein designated 29. The refrigeration apparatus thus comprises compressor 29, condenser 15, and evaporator 16 all of which are interconnected by conduit system 17 through which the refrigerant is cycled. The compressor 29 is driven by an electric motor 14 and the turbine 22 is coupled to an electromotive generator 23. In this embodiment, however, the turbine 22 is not interconnected with the conduit system 17 and therefore is not driven by the kinetic energy extracted from fluid or gaseous vapors flowing through the conduit system 17. Instead, the cogeneration system utilizes heat energy derived from operation of the compressor 29.

During the refrigerant cycle, the compressor is operated to compress low temperature refrigerant vapor into hot high pressure refrigerant gas. During the compression of the vapor the compressor temperature is substantially raised. Some compressors are air cooled; others are liquid cooled. In most cases the heat generated serves no useful purpose. In accordance with the present invention, the compressor 29 heat is transferred to a liquid coolant, preferably glycol, that is circulated through a compressor coolant circulation system comprising a conduit system 31 that is independent of the refrigerant cycling conduit system 17.

The coolant conduit system 31 is connected to the turbine 22 intake port 24 and outlet port 25. Coolant is circulated through the coolant conduit system by a pump (not shown) housed within a jacket 32 covering the compressor 29, as is conventional for liquid cooled compressors. The heat from the compressor body is transferred to the coolant as it flows through the compressor jacket, conduit system 31 section 33 within the jacket 32. As the coolant flows through the turbine 22 from the turbine intake port 24 to the turbine outlet port 25, the force of the fluid flow through the turbine causes the turbine 22 to rotate and drive the electromotive generator to generate electricity. From the turbine outlet port 25 the coolant flows through conduit section 34 to a hot coolant storage tank 35 where it is available to be circulated through a pipe system including a supply pipe 36 and a return pipe 37 to supply heated coolant where needed, such as in a radiant heat floor heating system.

The foregoing described FIG. 3 embodiment of the energy system utilizes excess energy recovery both in the form of heat transfer energy derived from the operation of the compressor and in the form of kinetic energy extracted from the coolant being pumped through the turbine 22 driving the electromotive generator to produce electricity. Both the heat transfer to the coolant and the kinetic energy extracted from the coolant flow otherwise would have been wasted energy.

Figure 4:
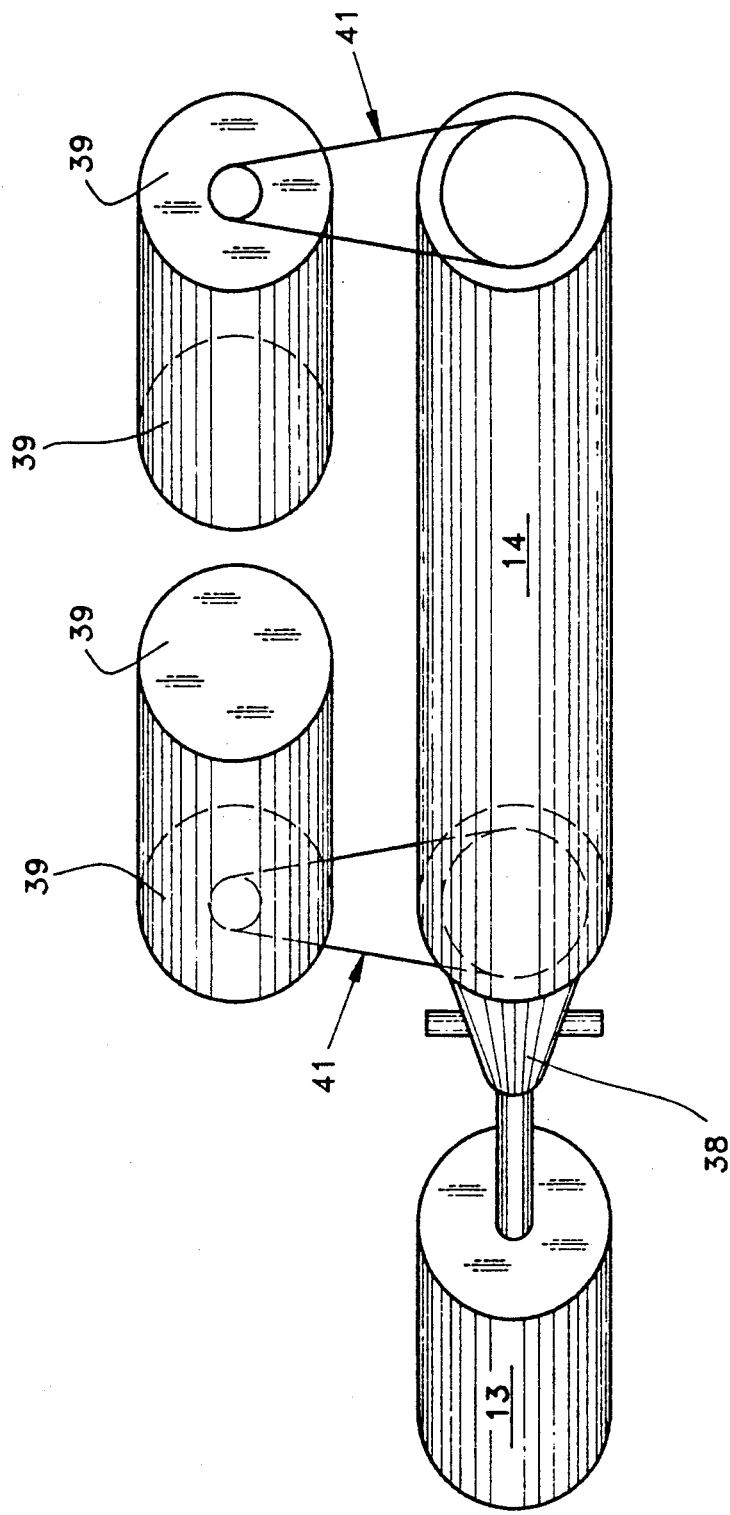
FIG. 4 is a diagrammatic view of an energy recovery system accessory applicable to the energy recovery systems depicted in FIGS. 1-3.

With reference to FIG. 4, there is illustrated a further system for enhancing surplus energy available from the components of refrigeration apparatus utilized in cold storage systems. The electric motor 14 used in such systems frequently has a horsepower rating in excess of that actually required to drive the compressor. Motors of the size for driving compressors are usually rated in quarter horsepower increments; and if a one-half horsepower might do the job it is better to use a three-quarter horsepower motor to be on the safe side.

In FIG. 4 the electric motor 14 is depicted as being coupled by an electric clutch 38 to the compressor 13. The electric motor 14 is preferably a constant running unit rather than being subjected to the wear and tear of frequent stops and starts. Accordingly, when the thermostat signals the refrigeration apparatus that the desired temperature has been obtained in the cold storage cell, the compressor is declutched from the drive motor 14 to interrupt the refrigeration cycle. Rather than permit the continued operation of the drive motor to represent wasted energy, a practical alternative is to couple two or more electromotive generators by drive systems, preferably pulley systems 41 to the continuously running motor 14. The number of generators that can be coupled to the motor 14 is, of course, subject to the available horsepower of the electric drive motor 14. When the compressor 13 is declutched from the motor 14, all of the power of the motor 14 becomes available to drive the generators 39. In any event, even with the electric motor driving the compressor, the electric motor power available generally is in excess of that needed to drive the compressor. If not used to drive the auxiliary generators, this surplus energy would be wasted.

Figure 5:
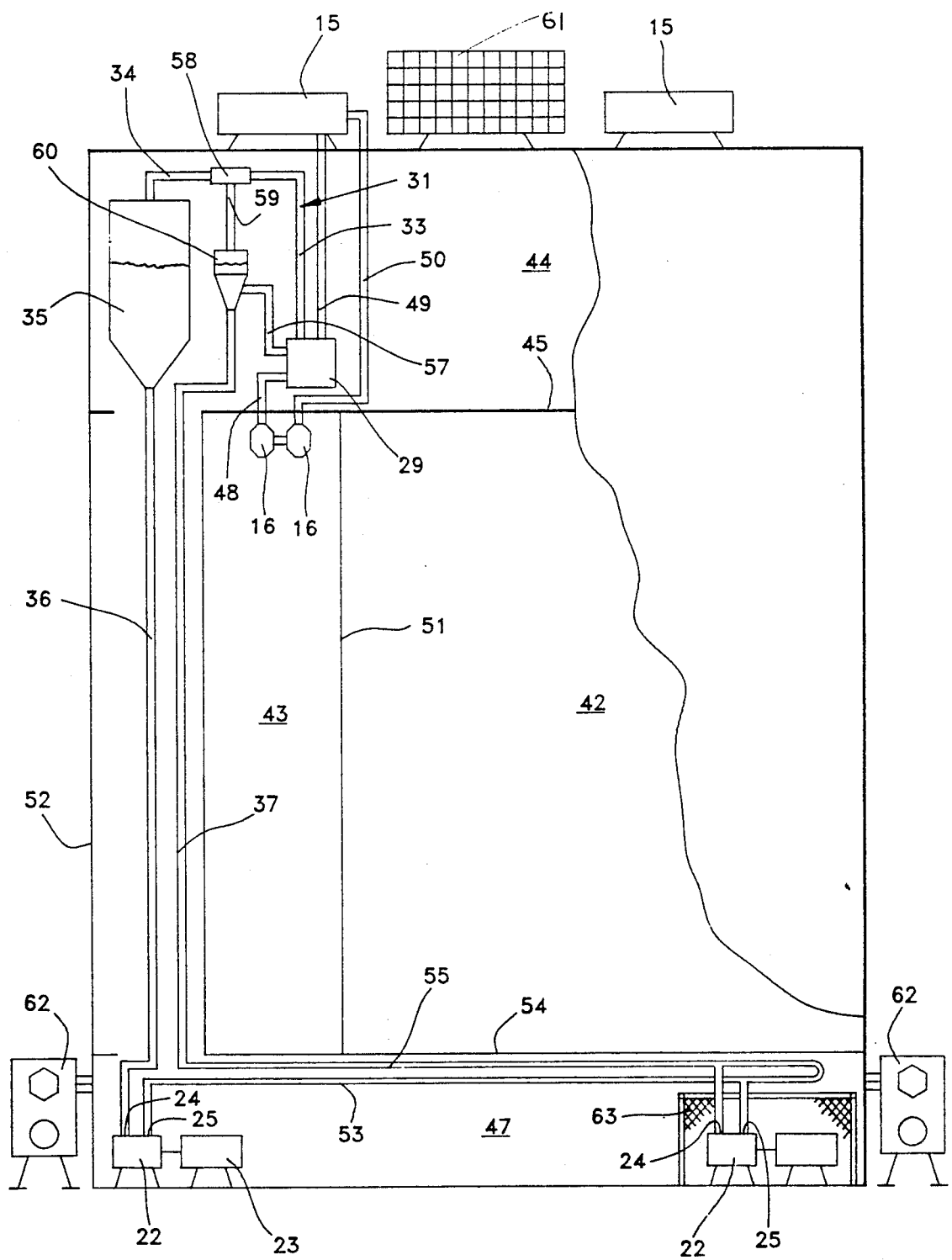
FIG. 5 is a diagrammatic view of a warehouse cold storage cell illustrating the general arrangement of the energy recovery system and related accessories for controlling the environment of the storage area.

Reference may be made to my U.S. Pat. No. 4,989,417 entitled "Cold Storage Warehouse" disclosing in greater detail a warehouse having a clusters of cells for receiving and storing frozen and refrigerated food products. FIG. 5 is a diagrammatic illustration of a cold storage warehouse to which an energy recovery system has been applied to a single compartment of a storage cell in accordance with the present invention. It will be understood that, if desired, each of the compartments in each of the storage warehouse cells in a warehouse of the type disclosed in my patent could be individually equipped with such energy recovery systems. It is current warehouse construction practice to utilize 25 to 100 ton compressors to refrigerate the whole warehouse even if a large percentage of the available floor space is seasonably vacant. By utilizing individual energy recovery systems in accordance with the present invention, it will be possible to use much less expensive and lower power consuming 3 to 10 ton coolant cooled compressors for cooling only storage cells requiring refrigeration.

Referring now to FIG. 5, the single cell shown is a two compartment unit partitioned into a freezer section 42 adjacent to a cooler section 43. The freezer section 42 is used for freezing and storing frozen foods at $-15°$ to $-25°$ F. and the cooler compartment 42 for storing refrigerated food products at 30° to 35° F. The engine room 44, the warehouse space above the top 45 of the freezer and cooler sections 42 and 43, houses some of the cogeneration system components. Other components are mounted on the roof 46 and yet others in the basement 47 beneath the freezer and cooler sections 42 and 43.

It will be understood that one or more compressors corresponding to the compressor 29 of the refrigeration apparatus 10-B (see FIG. 3), can be mounted in the engine room 44 above freezer and cooler compartment sections 42 and 43. Each compressor 29 would have suction through a suction line 48 on tandem evaporators 16 mounted on an inner wall near the ceiling of a compartments 42-43. Each compressor draws low temperature-low pressure refrigerant vapor through a suction line 48 into the compressor where it is compressed into hot, high pressure and temperature gas. The hot, high pressure gas flows through a conduit 49 to the roof top mounted condenser 15 where, as a heat transfer from the gas occurs, the gas condenses to a liquid. From the condenser 15 the liquid refrigerant flows through conduit 50 to the evaporators 16 where, because the pressure has been lowered by the compressor suction, the refrigerant is caused to boil by the heat transfer from the compartment into the evaporators. This heat transfer from the compartment to be cooled vaporizes the liquid refrigerant causing the refrigerant cycle to be repeated.

As described with respect to FIG. 3, the compressor 29 has the task of compressing the low temperature-low pressure vapor from the evaporators 16 into hot, high pressure gas for discharge into the condenser 15 on the roof top. This results in a heat transfer to the body of the compressor. In accordance with the present invention, the compressor heat is utilized to heat a coolant, which preferably is coolant. The glycol is circulated by a pump (not visible) within a compressor jacket 32 through a conduit system 31 independent of the refrigeration apparatus conduit system 17. A section 33 of the coolant conduit system 31 is connected to the internal coolant circuit of the compressor 29. The coolant flows from conduit section 33 into a conduit section 34 for discharge into a hot coolant storage tank 35 where is available for distribution through a pipe system having a supply pipe 36 and a return pipe 37.

As shown in FIG. 5, the hot coolant system when installed in a warehouse is more complex than it appears from FIG. 3. The hot coolant tank 35 preferably is located in the engine room above the top 45 of the storage cell compartments 42-43. The hot will be allowed to flow by gravity feed down the distribution pipe 36 located between the outer wall 51 of the storage cell and boundary wall 52 of the warehouse building to the basement 47 of the building. In the basement the lower end of the pipe 35 is connected to the intake port 24 of an energy recovery unit turbine 22 that is coupled to an electromotive generator 23. From an outlet port 25 on the turbine 22 the coolant is carried in a pipe 53 beneath the floor 54 across the basement to the inlet port 24 of a second turbine 22 that is also coupled to an electromotive generator 23. From the outlet port 25 of the second turbine the coolant is routed through pipe 55 back across the basement 47 where it is coupled to the return pipe 37 leading upward to the engine room to a coolant return reservoir 56. The coolant flowing through the return pipe 37 cools on its way to the return reservoir 56.

The coolant return reservoir 56 is connected by a short run of pipe 57 to the intake side of the conduit system 31 for circulating coolant through the compressor 29. The heated coolant from the compressor is carried by the conduit section, 34 of coolant conduit system 31 to the top of the hot coolant reservoir tank 35.

It should be noted that the level of the coolant in the coolant return reservoir 56 may tend to be lower than the level of the coolant in the hot coolant storage tank 35. It is preferable that the level of the fluid level in both the reservoir 56 and the storage tank 35 be equalized during the operation of the system. To provide the necessary lift of the coolant from the glycol return reservoir 56, a syphon 58 is placed in the hot coolant conduit 34. The coolant flowing from one or more compressor pumps into the conduit 34 provides the syphon actuating fluid. The suction of the syphon on the return reservoir 56 through conduit 59 lifts coolant from a vacuum chamber 60 atop the reservoir 56 to the conduit 34 for discharge into the storage tank.

The hot coolant flowing through the pipe system from the storage tank 35 back to the reservoir 46 represents energy energy recovery in two respects. The force of the glycol coolant flowing through the two basement turbines 22 results in hydroelectric generation from the electromotive generators coupled to the basement turbines. The heated coolant flowing through the pipes beneath the storage cells provides sufficient heat to protect the concrete base on which the storage cells are supported from cracking from low temperature induced stresses.

In FIG. 5 the cogeneration units, the turbine 22 and the electromotive generator 23 are shown are shown contained in a metal cage 63. The cage is grounded to prevent flux charges from the electromotive generator from causing discomfort to personnel working in the area of the machines.

Although in FIG. 5 the cogeneration system is detailed as affecting only the compartment 43 of the cold storage cell, it should be understood the system could be duplicated for as many cold storage cells and compartments as needed.

Also, although not a direct part of the energy recovery systems as disclosed in FIG. 5, other electricity producing components easily can be associated with the electric grid servicing the warehouse. Reference is made to a solar panel 61 on the roof above the storage cell and to auxiliary standby diesel motor generator sets 62 externally of the basement 47 of the warehouse.

While the invention has been illustrated with respect to specific embodiments thereof, these embodiments should be considered illustrative rather than limiting. Various modifications and additions may be made and will be apparent to those skilled in the art. Accordingly, the invention should not be limited by the foregoing description, but rather should be defined only by the following claims.

I claim:

1. An energy recovery system, comprising a combination of a refrigeration apparatus including refrigerant compressor, condenser and evaporator components operatively connected by a first conduit system forming a refrigerant flow circuit through which refrigerant is cycled with the refrigerant passing through fluid, vapor and gaseous stages,
   a motor for actuating the compressor to effect compression of the refrigerant,
   the motor being coupled to the compressor by a thermostatically controlled clutch,
   and an energy recovery unit including an electromotive generator coupled to a turbine for extracting kinetic energy from refrigerant flowing through the first conduit system,
   the turbine having a refrigerant suction intake and a refrigerant exhaust outlet connected to the conduit system,
   wherein kinetic energy extracted from refrigerant flow channelled through the turbine from the turbine suction intake and exhausted through the turbine exhaust outlet impels rotation of the turbine to drive the electromotive generator,
   and at least one auxiliary voltage generator is coupled to the motor for rotation thereby to produce electricity independently of the turbine driven electromotive generator upon the energy recovery unit being rendered inoperative when the refrigeration compressor is declutched from the motor.

2. An energy recovery system according to claim 1, in which:
   a motor having power in excess of that needed to drive the compressor of the refrigeration apparatus is coupled to the compressor,
   and one or more auxiliary voltage generators for utilizing the excess power available from the motor are coupled thereto for rotation to produce electricity independently of the turbine driven electromotive generator.

3. An energy recovery system according to claim 1, in which:
   the turbine for extracting the kinetic energy from the refrigerant is interposed in a section of the first conduit system between the evaporator and the compressor in which the refrigerant flow stage is vapor discharged from the evaporator,
   the vapor being pumped through the turbine back to the compressor,
   wherein the vapor flowing through the turbine causes the turbine to rotatably drive the electromotive generator.

4. An energy recovery system according to claim 1, in which:
   the turbine for extracting the kinetic energy from the refrigerant is interposed in a section of the conduit system between the condenser and the evaporator in which the refrigerant flow through the turbine is refrigerant fluid discharged from the condenser,
   the fluid flowing through the turbine causes the turbine to rotatably drive the electromotive generator.

5. An energy recovery system comprising;
   (a) a refrigeration apparatus including a compressor, a condenser and an evaporator coupled by a first conduit system forming a refrigerant flow circuit through which a refrigerant is cycled through fluid, vapor and gaseous stages, and
   (b) an energy recovery unit including a turbine coupled to an electromotive generator for rotatively driving the generator to produce electricity,
   the turbine having an intake port and an exhaust port,
   the compressor being operative to compress low temperature-low pressure refrigerant vapor into hot high pressure refrigerant gas,
   wherein during the compression of the refrigerant vapor into the hot high pressure refrigerant gas the compressor temperature is substantially raised, and
   (c) a source of coolant connected to the turbine intake port by a coolant circulating system independently of the first conduit system,
   wherein the force of the coolant flowing through the turbine from its intake port to its exhaust outlet causes the turbine to rotate and rotatably drive the electromotive generator in electricity generating direction.

6. An energy recovery system according to claim 5, in which:
   the compressor has a jacket through which the coolant is circulated by a pump to reduce the temperature of the compressor during compression of the low-temperature refrigerant vapor into high-temperature gas flowing to the condenser.

7. An energy recovery system according to claim 6, in which:
   the coolant while being circulated through the compressor jacket absorbs the compressor heat,
   the coolant after the discharge from the turbine output port is fed through the coolant circulating system to a storage tank.

8. An energy recovery system for controlling the temperature in a warehouse having a main floor partitioned into a plurality of compartmented cold storage cells, a basement beneath the main floor, an engine room above the storage cells and a roof above the engine room, the energy cogeneration system comprising:

(a) refrigeration apparatus having one or more refrigeration units servicing one or more of the storage cells;

each refrigeration unit having a compressor located in the engine room, a condenser mounted atop the warehouse roof, and at least one evaporator mounted on an interior wall of each storage cell compartment;

the compressor, condenser and evaporator of each refrigeration unit being operatively connected through a first conduit system forming a refrigerant flow circuit through which refrigerant is cycled with the refrigerant passing through fluid, vapor and gaseous stages, (b) an energy recovery unit having a turbine coupled to an electromotive generator, the turbine and electromotive generator coupled thereto being housed in the warehouse externally of the storage cell, the turbine having an intake port and an exhaust outlet connected in line to the first conduit system of the refrigeration apparatus, wherein refrigerant flow channelled through the turbine causes rotation of the turbine to drive an electromotive generator.

9. Energy recovery system according to claim 1, in which:

the energy recovery unit turbine and electromotive generator are housed within the basement of the warehouse.

10. An energy recovery system according to claim 8, in which:

the energy recovery unit is contained within a metal screen cage that is grounded to prevent electrostatic effects of personnel working in the warehouse.

11. An energy recovery system according to claim 8, in which:

a turbine is interposed between the evaporator and the compressor in a section of the first conduit system in which the refrigerant flow is vapor discharged from the evaporator with the vapor being pulled through the turbine by the suction of the compressor, wherein kinetic energy extracted from the vapor flowing through the turbine causes the turbine to rotatably drive the electromotive generator.

12. An energy recovery system according to claim, 8 in which:

the turbine is interposed between the condenser and the evaporator in a section of the first conduit system in which the refrigerant flow through the turbine is refrigerant fluid discharged from the condenser, the fluid flowing through the turbine causes the latter to rotatably drive the electromotive generator.

13. An energy recovery system according to claim 8, in which:

the compressor is operative to compress low-temperature refrigerant vapor into hot high pressure refrigerant gas causing the compressor temperature to be raised substantially, and the compressor has a coolant circulating system containing a coolant for reducing the compressor temperature and producing heated coolant, the coolant circulating system is isolated from the first conduit system forming the refrigerant flow circuit and is independently connected to the intake port and the exhaust outlet on the turbine, wherein kinetic energy extracted from the heated coolant flowing through the turbine from its intake port to an outlet port causes the turbine to rotate and rotatably drive the electromotive generator.

14. An energy recovery system according to claim 13, in which:

the heated coolant after discharge from the turbine outlet is fed through the coolant circulating system to a storage tank.

15. An energy recovery system according to claim 14, in which:

the heated coolant is pumped from the storage tank through heating pipe system extending beneath the main floor of the warehouse to provide heat to prevent freeze buckling of the main floor by the low storage cell temperature in the storage cells.

16. An energy recovery system according to claim 8, in which:

an electric motor drives the compressor of each refrigeration apparatus, the electric motor is coupled to the compressor by a thermostatically controlled clutch, and at least one auxiliary voltage generator is coupled to the electric motor for rotation thereby to produce electricity independently of the turbine driven electromotive generator upon the recovery unit being rendered inoperative when the compressor of the refrigeration apparatus is declutched from the motor.

17. An energy recovery system according to claim 8, in which:

an electric motor having power in excess of that needed to drive the compressor of the refrigeration apparatus is coupled to the compressor, and one or more auxiliary voltage generators capable of utilizing the excess power available from the electric motor are coupled to the electric motor for rotation thereby to produce electricity from the auxiliary voltage generators.

18. An energy recovery system according to claim 17, in which:

the auxiliary voltage generators are pulley driven from power takeoffs on the electric motor coupled to the compressor.

19. An energy system according to claim 14, in which:

the heated coolant is gravity fed through a pipe system to at least one unit located at the basement level.

the pipe system has at least one branch coupled to the intake port of a basement energy recovery unit turbine and second branch coupled to the turbine outlet port, the second branch including a pipe extending the length of the basement to provide heat to the underside of the basement floor.

20. An energy recovery unit according to claim 19, in which:

the pipe system includes return pipelines from the basement to a return reservoir located adjacent the storage tank, and a vacuum chamber atop the return reservoir connected to a syphon in the conduit discharging coolant to the hot coolant storage tank, wherein the fluid level in the storage tank and the return reservoir are maintained at substantially the same level.

* * * * *